(12) United States Patent
Chandrasekharan et al.

(10) Patent No.: US 7,882,489 B2
(45) Date of Patent: Feb. 1, 2011

(54) INTEGRATED CODE GENERATION FOR ADAPTER-SPECIFIC PROPERTY TEMPLATE

(75) Inventors: Sivakumar Chandrasekharan, Alameda, CA (US); Yury Kosov, San Francisco, CA (US); Zhengyuan Qiao, Burlingame, CA (US)

(73) Assignee: International Business Machines Corporation, Armonk, NY (US)

( * ) Notice: Subject to any disclaimer, the term of this patent is extended or adjusted under 35 U.S.C. 154(b) by 1469 days.

(21) Appl. No.: 11/284,563

(22) Filed: Nov. 22, 2005

(65) Prior Publication Data

US 2007/0168934 A1 Jul. 19, 2007

(51) Int. Cl.
G06F 9/44 (2006.01)
G06F 3/00 (2006.01)

(52) U.S. Cl. .................. 717/106; 719/311; 719/319; 719/328; 719/329

(58) Field of Classification Search .................. None
See application file for complete search history.

(56) References Cited

U.S. PATENT DOCUMENTS

| | | | |
|---|---|---|---|
| 6,269,475 B1 * | 7/2001 | Farrell et al. ............. 717/113 |
| 6,558,431 B1 * | 5/2003 | Lynch et al. ............. 715/210 |
| 6,591,403 B1 * | 7/2003 | Bass et al. ................. 716/5 |
| 7,020,660 B2 * | 3/2006 | Woodring ............ 707/103 R |
| 7,076,763 B1 * | 7/2006 | DeGroote et al. ......... 717/112 |
| 7,152,228 B2 * | 12/2006 | Goodwin et al. .......... 717/146 |
| 2003/0149934 A1 * | 8/2003 | Worden ................... 715/513 |
| 2003/0172368 A1 | 9/2003 | Alumbaugh et al. ...... 717/106 |
| 2003/0229885 A1 * | 12/2003 | Gownder et al. ......... 717/115 |
| 2003/0236925 A1 | 12/2003 | Balek et al. .............. 709/328 |
| 2004/0015832 A1 * | 1/2004 | Stapp et al. .............. 717/106 |
| 2004/0111730 A1 | 6/2004 | Apte ........................ 719/330 |
| 2004/0168124 A1 * | 8/2004 | Beisiegel et al. .......... 715/513 |

* cited by examiner

Primary Examiner—Tuan Q Dam
Assistant Examiner—Zheng Wei
(74) Attorney, Agent, or Firm—Yee & Associates, P.C.; Prentiss W. Johnson

(57) ABSTRACT

A computer implemented method, data processing system, and computer usable code are provided for integrated code generation. The aspects of the present invention load properties associated with a saved template. Properties associated with a saved template are processed by replacing the properties with integrated code from an integrated code content template. In response to all of the properties being processed, the integrated code is saved to an integrated code file.

20 Claims, 7 Drawing Sheets

```
<?xml version="1.0" encoding="UTF-8" ?>
<!-- edited with XMLSPY v5 U (http://www.xmlspy.com) by mc dou (Keouc Inc) -->
<user_templates formatversion="4.2.2" id="Utilities"
    xmlns:tmpl="http://www.ibm.com/websphere/crossworlds/Sapphire/CodeGenerationTemplate"
    xmlns:xsi="http://www.w3.org/2001/XMLSchema-instance" tmpl:version="4.2.2">
  <stamp format="yyyyMMdd'T'kk:mm:ss.S"
    timezone="GMT">20031021T24:56:38.233</stamp>
  <tmpl:template tmpl:id="ConnectorTemplate" tmpl:name="ConnectorTemplate"
    tmpl:isReadOnly="true" tmpl:hide="true">
    <tmpl:params>
      <tmpl:param tmpl:name="packageName" tmpl:type="String" tmpl:role="in"
        tmpl:description="" tmpl:minOccurs="1" tmpl:maxOccurs="1"/>
      <tmpl:param tmpl:name="imports" tmpl:type="String[]" tmpl:role="in"
        tmpl:description="" tmpl:minOccurs="1" tmpl:maxOccurs="1"/>
      <tmpl:param tmpl:name="className" tmpl:type="String" tmpl:role="in"
        tmpl:description="" tmpl:minOccurs="1" tmpl:maxOccurs="1"/>
      <tmpl:param tmpl:name="propNames" tmpl:type="String[]" tmpl:role="in"
        tmpl:description="" tmpl:minOccurs="1" tmpl:maxOccurs="1"/>
      <tmpl:param tmpl:name="propValues" tmpl:type="String[]" tmpl:role="in"
        tmpl:description="" tmpl:minOccurs="1" tmpl:maxOccurs="1"/>
    </tmpl:params>
    <tmpl:description/>
    <tmpl:image/>
    <tmpl:imports/>
    <tmpl:code>
      package ${packageName};
      <tmpl:for-each tmpl:param="imports" tmpl:index="i">import ${imports[#{i}]};
      </tmpl:for-each>public class ${className}{
        <tmpl:for-each tmpl:param="propNames" tmpl:index="i">public final static String
        ${propNames[#{i}]}="${propValues[#{I}]}";</tmpl:for-each>
        public static CWProperty getConfigProperty(String propName){ try { return
        CWConnectorUtil.getHierarchicalConfigProp(propName); } catch
        (WrongPropertyException e) {e.printStackTrace(); //TODO trace the error return null;} } }
    </tmpl:code>
  </tmpl:template>
</user_templates>
```

702 braces the `<stamp>` through `</tmpl:params>` section.
704 braces the `public static CWProperty getConfigProperty...` lines.

```
package com.adapters.TestAdapter;
    import com.crossworlds.cwconnectorapi.CWConnectorUtil;
    import com.crossworlds.cwconnectorapi.CWProperty;
    import com.crossworlds.cwconnectorapi.exceptions.WrongProperyException;

public class AdapterConstants{
        public final static String PROP_ApplicationUserName="ApplicationUserName";
        public final static String PROP_ApplicationPassword="ApplicationPassword";
        public final static String PROP_EventVault="EventVault";
        public final static String PROP_InDoubtEvents="InDoubtEvents";
        public final static String PROP_ArchivedProcessed="ArchivedProcessed";
        public final static String PROP_KeepRelations="KeepRelations";
        public final static String PROP_DefaultPolicy="DefaultPolicy";
        public final static String PROP_UseDefaults="UseDefaults";
        public final static String PROP_HostName="HostName";
        public final static String PROP_EmatrixServer="EmatrixServer";
        public final static String PROP_HandlerMissingChildObject="HandleMissingChildObject";
        public final static String PROP_DefaultVault="DefaultVault";
    public static CWProperty getConfigProperty(String propName){
        try{
            return CWConnectorUtil.getHierarchicalConfigProp(propName);
        }
        catch(WrongPropertyException e){
            e.printStackTrace():
            //TODO trace the error
            return null;
        }
    }
}
```

INTEGRATED CODE GENERATION FOR ADAPTER-SPECIFIC PROPERTY TEMPLATE

BACKGROUND OF THE INVENTION

1. Field of the Invention

The present invention relates generally to code generation. More particularly, the present invention relates to integrated code generation for adapter-specific property templates.

2. Description of the Related Art

Business integration products optimize operations by integrating and automating business processes. WebSphere® Business Integration products help clients to interconnect their islands of information and make full use of the message-based architecture. WebSphere® Business Integration products are available from International Business Machines Corporation.

Historically, isolated applications were written to solve specific problems. There was little vision at the time of an application landscape that would cover the whole range of business requirements, so the need for an integrated architecture was not apparent. As a result, solutions evolved on a variety of platforms. If and where integration was needed, it was usually achieved by hosting the applications on the same system and sharing files. This was no great restriction, since most applications back then were batch-oriented, and large central computers were the accepted technology standard.

When online processing became possible, businesses found it more acceptable from a risk and system capacity perspective to just collect data during the day and do the actual processing during nightly batch runs. This mode of operation is still quite prevalent in businesses today.

With the evolution of database management systems, the models surrounding the sharing of information began a trend towards integrating information across systems via database federation, transformation, and replication technologies. The models required the systems sharing information to share the physical data models, processing rules, and constraints. This sharing resulted in tight coupling between applications. Still, in the real world of Information Technology, which includes legacy technology and closed systems. Many cases are present in which this is the only feasible style of integration, and in those cases it provides good service. Incidentally, this integration approach coincided with two-tier client-server architectures and continues to be in use.

Integration at a fundamental level is about making sure information from different business applications can be shared and used across and beyond the enterprise in a reliable and secure manner through application connectivity. With the evolution of distributed object and message-oriented middleware technologies, it is now possible to integrate isolated applications running on heterogeneous platforms. This approach allows legacy applications to be connected together with minimal changes needed in existing code. Applications continue to use their own data formats while an "integration broker" provides the necessary mapping, augmentation, and distribution of data at runtime. Message-oriented middleware allows event-based loose coupling between the connected applications and offers increased reliability and flexibility.

Process integration is at the highest level of business integration. Process integration implies coordinating and controlling activities that may span multiple systems and involve people in a variety of roles. Process integration structures, implements, automates, and manages business processes while providing runtime measurements that will then assist in optimizing the process models. Process integration can support long-running transactions and roles-based human activities. The flow of a business event through the process can be modified by external input, either by parameters provided when the process is instantiated or by information retrieved from external data sources such as an application database, or by human decisions such as in an approval step.

Process integration can also be seen as the business logic layer that determines what needs to be done at a given point in a process, as opposed to how it gets done, which is typically the role of the application. Separating the "what" from the "how" allows flexibility since one can be changed without affecting the other.

WebSphere® Business Integration adapters enable data to move between an application, a technology, or a packaged legacy system and the underlying transport infrastructure. These adapters access, transform, and route data through the integration brokers.

Application adapters allow interactions with specific applications and are intermediaries between collaborations or message-flows and applications. These adapters transform data from the application into business objects that can be manipulated by the collaborations and message-flows, and transform business objects from the collaborations and message-flows into data that can be received by the specific application.

Technology adapters allow interactions that conform to specific technology standards. For example, the extensible markup language (XML) connector can be used for sending data from WebSphere® InterChange Server collaborations to a Web server, even if that Web server resides beyond a firewall on a network that is not running the connector agent or other IBM WebSphere® software. Extensible markup language (XML), Java™ database connectivity (JDBC™), Java™ text (JTEXT), and Java™ message service (JMS) adapters are examples of technology adapters.

Mainframe adapters allow interactions with legacy applications running on mainframes, such as the CICS adapter.

E-business adapters provide proven solutions for securely connecting over the firewall to clients' desktops, to trading partners' internal applications, and to online marketplaces and exchanges, for example, the E-Mail adapter.

WebSphere® Business Integration Adapters are built using a common customizable Java™-based framework, and can be deployed on a variety of platforms. However, when adapter developers are developing their adapters for WebSphere® Business Integration, the developers must read the Connector Development Guide for Java™, use Connector Configurator to create their adapter-specific property template, and program adapter code for the adapter-specific property template. Programming adapter code for the adapter-specific property template is difficult, time consuming, and susceptible to mistakes.

SUMMARY OF THE INVENTION

The different aspects of the present invention provide a computer implemented method, data processing system, and computer usable code for integrated code generation. Properties associated with a saved template are loaded. Then, the properties associated with a saved template are processed by replacing the properties with integrated code from an integrated code content template. The replaced integrated code is saved to an integrated code file in response to all of the properties being processed.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 7 is an exemplary Java™ code content template in accordance with an illustrative embodiment of the present invention.

DETAILED DESCRIPTION OF THE PREFERRED EMBODIMENT

Figure 1:
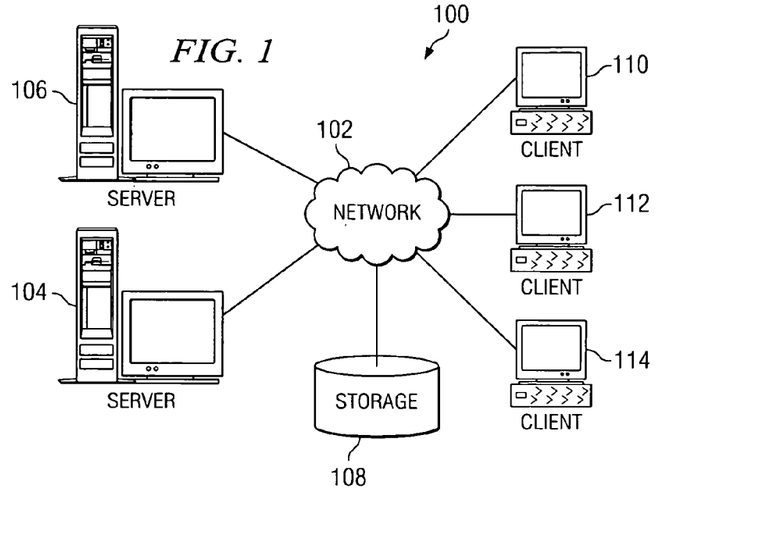
FIG. 1 depicts a pictorial representation of a network of data processing systems in which aspects of the present invention may be implemented.
Figure 2:
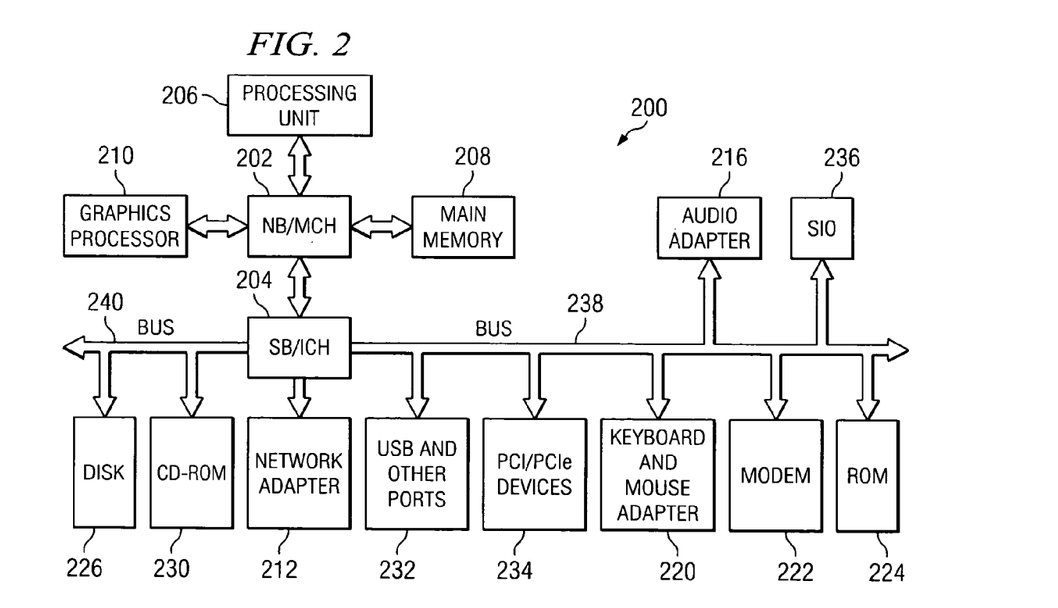
FIG. 2 depicts a block diagram of a data processing system in which aspects of the present invention may be implemented.

The present invention provides integrated code generation for adapter-specific property. With reference now to the figures and in particular with reference to FIGS. 1-2, exemplary diagrams of data processing environments are provided in which embodiments of the present invention may be implemented. It should be appreciated that FIGS. 1-2 are only exemplary and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 1 depicts a pictorial representation of a network of data processing systems in which aspects of the present invention may be implemented. Network data processing system 100 is a network of computers in which embodiments of the present invention may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. These clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different embodiments of the present invention.

With reference now to FIG. 2, a block diagram of a data processing system is shown in which aspects of the present invention may be implemented. Data processing system 200 is an example of a computer, such as server 104 or client 110 in FIG. 1, in which computer usable code or instructions implementing the processes for embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206 and coordinates and provides control of various components within data processing system 200 in FIG. 2. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java™ programs or applications executing on data processing system 200 (Java is a trademark of Sun Microsystems, Inc. in the United States, other countries, or both).

As a server, data processing system 200 may be, for example, an IBM® eServer™ pSeries® computer system, running the Advanced Interactive Executive (AIX®) operating system or the LINUX® operating system (eServer, pSeries and AIX are trademarks of International Business Machines Corporation in the United States, other countries, or both while LINUX is a trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for embodiments of the present invention are performed by processing unit 206 using computer usable program code, which may be located in a memory such as, for example, main memory 208, ROM 224, or in one or more peripheral devices 226 and 230.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the present invention may be applied to a multiprocessor data processing system.

In some illustrative examples, data processing system 200 may be a personal digital assistant (PDA), which is configured with flash memory to provide non-volatile memory for storing operating system files and/or user-generated data.

A bus system may be comprised of one or more buses, such as bus 238 or bus 240 as shown in FIG. 2. Of course, the bus system may be implemented using any type of communication fabric or architecture that provides for a transfer of data between different components or devices attached to the fabric or architecture. A communication unit may include one or more devices used to transmit and receive data, such as modem 222 or network adapter 212 of FIG. 2. A memory may be, for example, main memory 208, ROM 224, or a cache such as found in NB/MCH 202 in FIG. 2. The depicted examples in FIGS. 1-2 and above-described examples are not meant to imply architectural limitations. For example, data processing system 200 also may be a tablet computer, laptop computer, or telephone device in addition to taking the form of a PDA.

The aspects of the present invention provide integrated code generation for adapter-specific property. When adapter developers create or modify their adapter-specific property templates, aspects of the present invention generate adapter-specific property Java™ code based upon the saved template. The aspects of the present invention easily and quickly generate the correct Java™ code for adapter-specific property template. Other aspects of the present invention provide for in-place adapter code generation for existing adapter-specific property template code. When adapter developers develop their adapter-specific integrated code, the developers may add adapter-specific property template Java™ code at any place and any time in their Java™ code by using the described methodology.

Adapter-specific properties and generated Java™ code for the adapter-specific properties are part of an application-specific component in WebSphere® Business Integration Adapter. WebSphere® Business Integration Adapter is a composite of Adapter Framework and Application-specific component.

WebSphere® Business Integration Adapter consists of a collection of software, application programming interfaces, and tools that enable applications to exchange business data though an integration broker. Each business application requires its own application-specific adapter to participate in the business integration process.

If one application, such as Systems, Applications, and Products in Data Processing (SAP), intends to communicate to another application, such as Oracle, through WebSphere® Business Integration System, the need is present to convert the application-specific business objects into generic business objects that WebSphere® Business Integration System understands. SAP is a vast suite of software that helps business managers implement Enterprise Resource Planning (ERP), which is a business management system that integrates all facets of the business, including planning, manufacturing, sales, and marketing. Additionally, the need is present to convert the generic business objects back into application-specific business objects, these conversions are performed by WebSphere® Business Integration Maps.

Adapter Framework provides the generic functionalities to communicate with WebSphere® integration brokers. Application-specific components contain code that application developers write to specify the actions of the application-specific tasks of the adapter. Application specific tasks are tasks such as basic initialization, setup methods, business object handling, and event notification.

Figure 3:
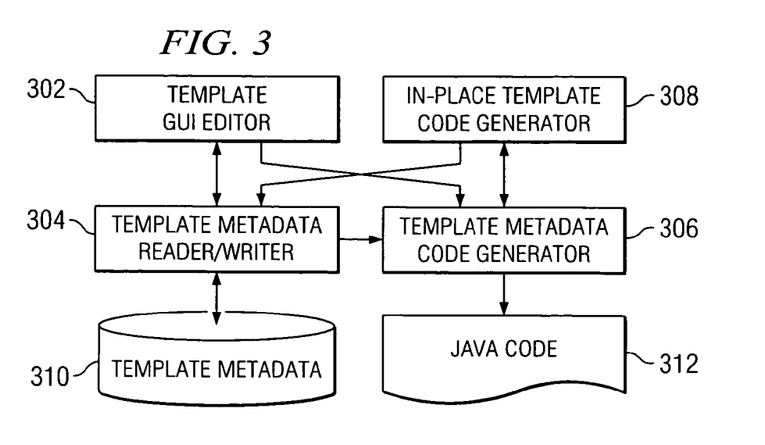
FIG. 3 depicts a functional block diagram of the components used to generated integrated code for adapter-specific property templates in accordance with an illustrative embodiment of the present invention.

Turning now to FIG. 3, a functional block diagram of the components used to generate adapter-specific integrated code for adapter-specific property templates is depicted in accordance with an illustrative embodiment of the present invention. Adapter-specific integrated code generation uses template graphical user interface (GUI) editor 302, template metadata reader/writer 304, template metadata code generator 306, and in-place template code generator 308. Template GUI editor 302 is a graphic tool to allow adapter developers to create or modify adapter-specific property templates. Template GUI editor 302 is software that may be stored in main memory 208 and displayed using graphics processor 210 of FIG. 2.

Template metadata reader/writer 304 allows template GUI editor 302 to read data from or write data to template metadata storage 310. Template metadata code generator 306 generates adapter-specific property Java™ code 312 when template metadata is created or modified by a user through template GUI editor 302. In-place template code generator 308 inserts adapter-specific property template Java™ code 312 at any place and at any time when adapter developers program adapter-specific integrated code. In-place template code generator 308 also provides Java™ language validation to make sure any generated adapter-specific integrated code is correct.

Figure 4:
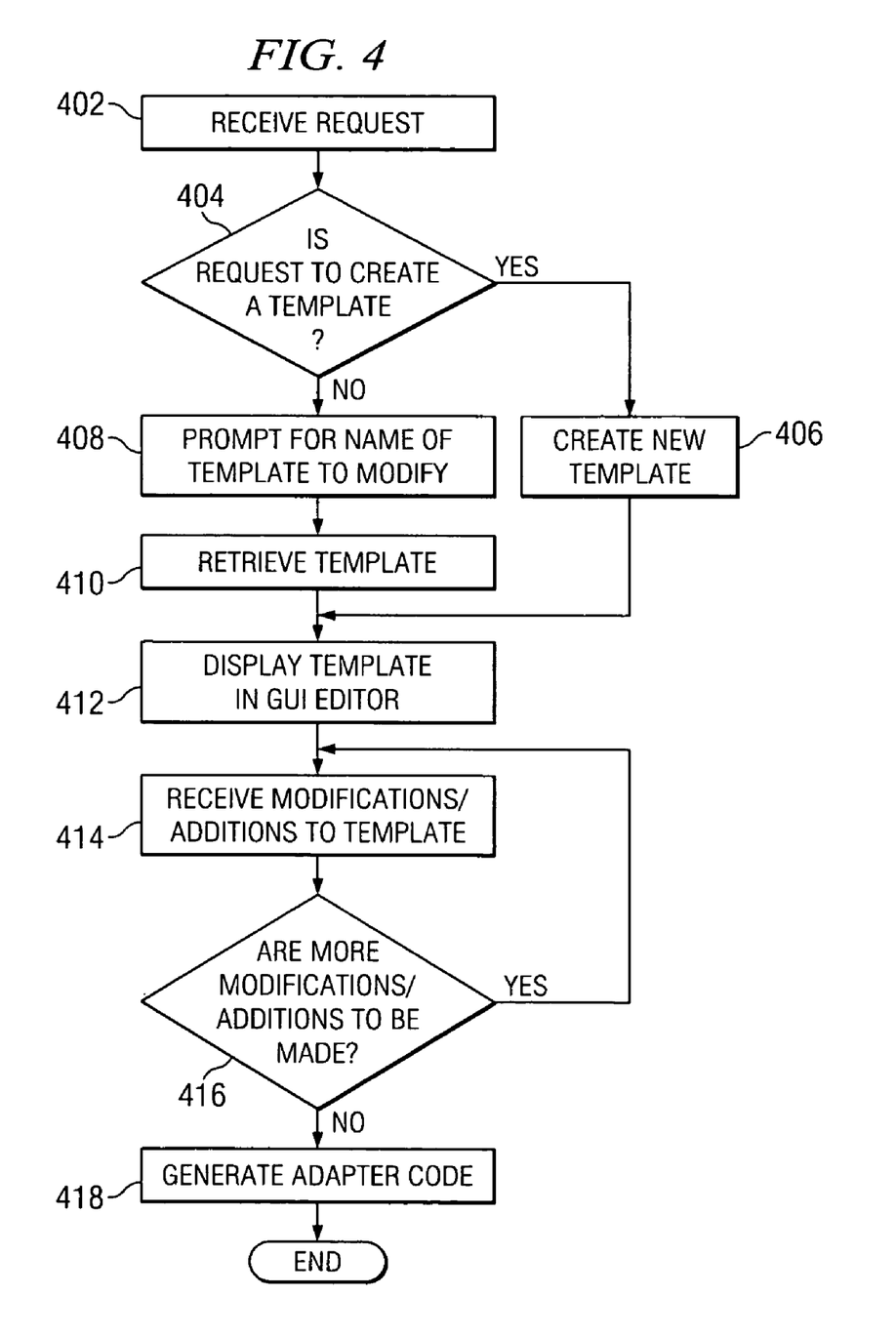
FIG. 4 depicts a flowchart of the operation used in creating adapter-specific Java™ code in accordance with an illustrative embodiment of the present invention.

FIG. 4 is a flowchart depicting the operation used in creating adapter-specific integrated code in accordance with an illustrative embodiment of the present invention. As the operation begins, a template GUI editor, such as template GUI editor 302 of FIG. 3, receives a request from a user, usually a developer, to create or modify an adapter-specific template (step 402). A determination is made as to whether the request is to create a new template (step 404). If the request is to create a new template, the template GUI editor creates a new template file (step 406). If the request is to modify an existing template, the template GUI editor prompts the user for the name of the template that is to be modified (step 408). Once the template name is received, template GUI editor retrieves the template (step 410) and displays the template on a display (step 412). If a new template is created in step 406, the template GUI editor displays a blank template to the user in the GUI editor (step 412). The GUI editor may be a graphic tool which allow adapter developers to create adapter-specific properties. The GUI editor supports property type, hierarchical properties, multiple values, flags, dependencies properties, and default values for the properties. The GUI editor saves the created or modified adapter-specific template as an adapter-specific property template metadata file.

The template GUI editor is software that may be stored in main memory 208 and displayed using graphics processor 210 of FIG. 2. The user makes modifications or additions to the displayed template using the template GUI editor (step 414). Then a determination is made as to whether any additional modifications or additions are to be made to the new or modified template (step 416). The determination may be through the user closing the template GUI editor and being prompted to save any changes or through the user saving all data and closing the template GUI editor resulting in a saved template.

Once the user indicates that no more additions or modifications are required, the template GUI editor notifies a template metadata code generator, such as template metadata code generator 306 of FIG. 3, to generate adapter-specific property Java™ code (step 418), with the operation ending thereafter.

Figure 5:
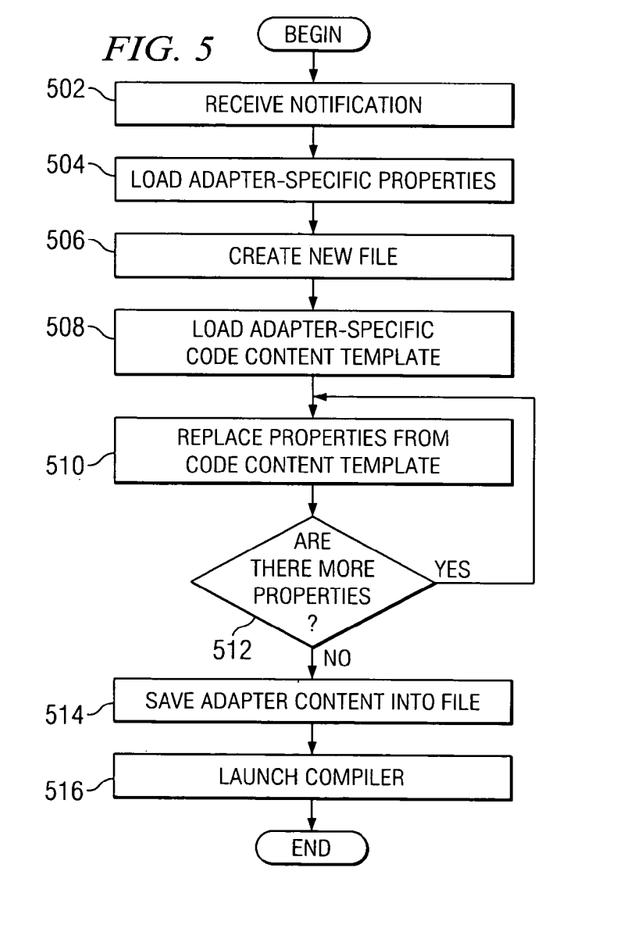
FIG. 5 depicts a flowchart of integrated code generation in accordance with an illustrative embodiment of the present invention.

FIG. 5 is a flowchart of adapter-specific integrated code generation in accordance with an illustrative embodiment of the present invention. As the adapter-specific integrated code generation operation begins, a notification is received that a modification or creation of an adapter-specific template is complete and has been saved as a saved template (step 502). Adapter-specific properties are then loaded from a template metadata reader, such as template metadata reader/writer 304 of FIG. 3 (step 504). Since Java™ code is being created the integrated code generator retrieves a Java™ class name and package name from GUI editor, and creates the Java™ file (step 506).

A pre-defined adapter-specific property Java™ code content template is loaded; which is designed for adapter implementation (step 508). The Java™ code content template, also considered integrated code content template, contains all support import libraries necessary for the integrated code generation. For each adapter-specific property, the code content generator replaces the properties from the Java™ code content template (step 510). The integrated code generator then determines if all the properties have been replaced (step 512). If properties remain to be replaced, the integrated code generator returns to step 510. When all the properties are processed, the integrated code generator saves the adapter content into the previously created Java™ file creating an adapter-specific integrated code file (step 514). As a last step of the operation, the integrated code generator launches a compiler to build the Java™ file (step 516).

Figure 6A:
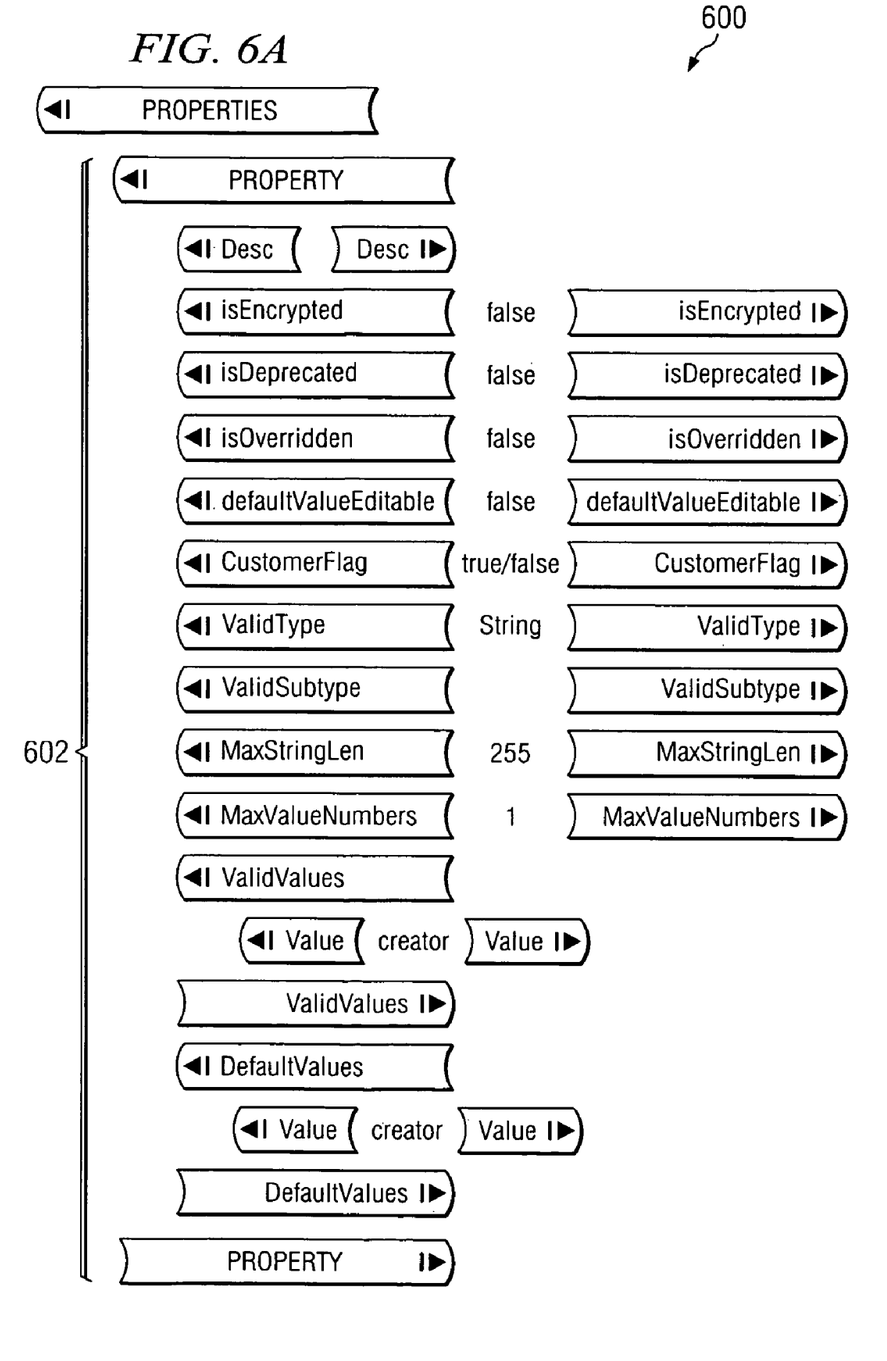
FIGS. 6A and 6B depict an exemplary adapter-specific template in accordance with an illustrative embodiment of the present invention.
Figure 6B:
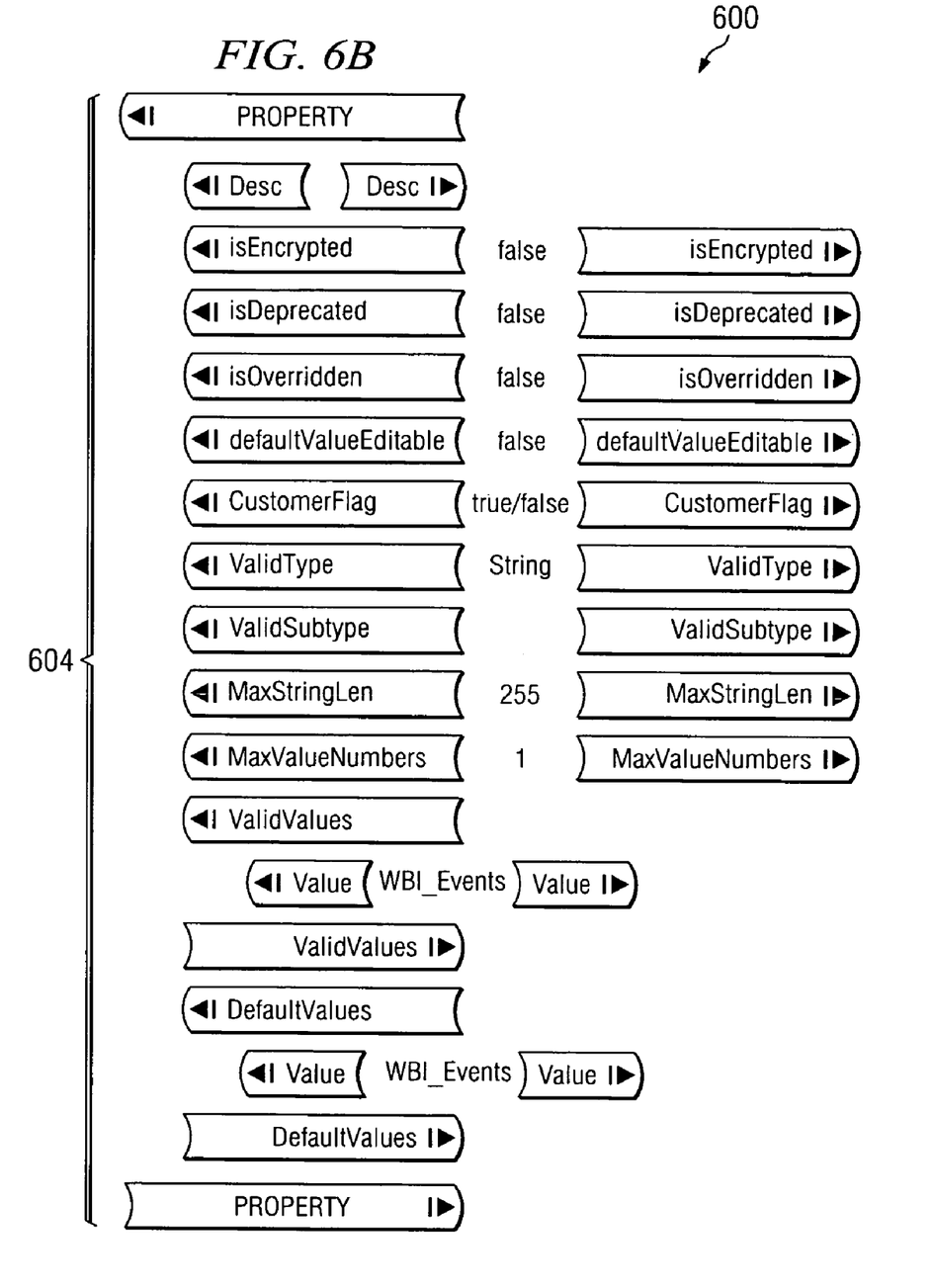

FIGS. 6A and 6B depict an exemplary adapter-specific template in accordance with an illustrative embodiment of the present invention. Exemplary adapter-specific template 600 depicts a portion of an XML adapter-specific template that is created as described in step 502 of FIG. 5. In the depicted example, section 602 depicts the implementation of a "creator" field, and the parameters associated with the field. Section 604 depicts the implementation of a "WBI_Events" field, and the parameters associated with the field.

FIG. 7 is an exemplary Java™ code content template in accordance with an illustrative embodiment of the present invention. Exemplary Java™ code content template 700 depicts pre-define adapter-specific property Java™ code content template that is designed for adapter implementation described in step 508 of FIG. 5. Java™ code content template 700 contains all support import libraries necessary for the integrated code generation. The libraries are shown in section 702 while static replacement values are shown in section 704.

Figure 8:
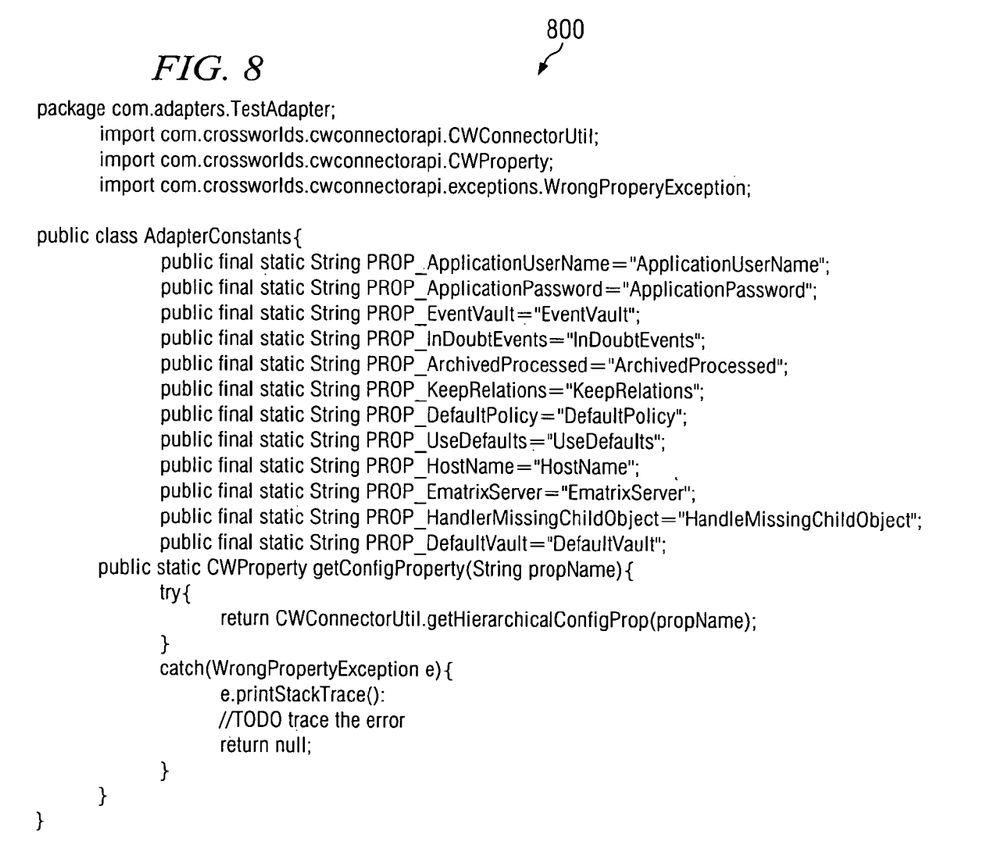
FIG. 8 is an exemplary generated adapter-specific integrated code in accordance with an illustrative embodiment of the present invention.

FIG. 8 is an exemplary generated adapter-specific integrated code in accordance with an illustrative embodiment of the present invention. Exemplary generated adapter-specific integrated code 800 depicts integrated code file that is generated as described in step 514 of FIG. 5 adapter-specific integrated code 800 is the non-compiled code generated when the code content generator replaces each adapter-specific property with the properties from the Java™ code content template.

Thus, aspects of the present invention provide integrated code generation for adapter-specific property templates. When adapter developers create or modify adapter-specific property templates using the described tools, adapter-specific property adapter-specific code is generated based upon the saved template. Adapter developers are also provided with modification tools that allow for adapter-specific property template Java™ code to be added at any place and any time in their Java™ code.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for integrated code generation, the computer implemented method comprising:
loading properties associated with a saved template;
processing the properties associated with the saved template to replace the properties with integrated code generated from an integrated code content template; and
responsive to all of the properties being processed, saving the integrated code to an integrated code file, wherein the integrated code content template contains all support import libraries necessary for the integrated code generation, wherein the generated integrated code is adapter-specific integrated code for adapter-specific property templates that is operable by an integration broker to facilitate an exchange of data with other applications in a business integration process.

2. The computer implemented method of claim 1, further comprising:
launching a compiler to build executable code based on the integrated code file.

3. The computer implemented method of claim 1, wherein loading properties associated with the saved template is initiated responsive to receiving a notification that a template has been saved.

4. The computer implemented method of claim 1, further comprising:
receiving a request to modify a template;
receiving modifications to the template;
determining if modifications to the template are complete by saving the template forming the saved template; and
responsive to saving the template, initiating the generation of integrated code by sending a notification.

5. The computer implemented method of claim 4, wherein the modifications made to the template are made through a graphical user interface editor.

6. The computer implemented method of claim 5, wherein the graphical user interface supports property type, hierarchical properties, multiple values, flags, dependencies property, and default values for the properties.

7. The computer implemented method of claim 1, wherein the integrated code is adapter-specific integrated code.

8. A data processing system comprising:
a bus system;
a communications system connected to the bus system;
a storage device connected to the bus system, wherein the storage device includes a set of instructions; and
a processing unit connected to the bus system, wherein the processing unit executes the set of instructions to load properties associated with a saved template; process the properties associated with the saved template to replace the properties with integrated code generated from an integrated code content template; and save the integrated code to an integrated code file in response to all of the properties being processed, wherein the integrated code content template contains all support import libraries necessary for the integrated code generation, wherein the generated integrated code is adapter-specific integrated code for adapter-specific property templates that is operable by an integration broker to facilitate an exchange of data with other applications in a business integration process.

9. The data processing system of claim 8, wherein the processing unit further executes the set of instructions to launch a compiler to build executable code based on the integrated code file.

10. The data processing system of claim 8, wherein the instructions to load properties associated with the saved template is initiated in response to receiving a notification that a template has been saved.

11. The data processing system of claim 8, wherein the processing unit further executes the set of instructions to receive a request to modify a template; receive modifications to the template; determine if modifications to the template are complete by saving the template forming the saved template; and initiate the generation of integrated code by sending a notification in response to saving the template.

12. The data processing system of claim 11, wherein the modifications made to the template are made through a graphical user interface editor.

13. The data processing system of claim 12, wherein the graphical user interface supports property type, hierarchical properties, multiple values, flags, dependencies property, and default values for the properties.

14. A computer program product comprising: computer-readable storage medium including computer usable program code for integrated code generation, the computer program product including:
computer usable program code for loading properties associated with a saved template;
computer usable program code for processing the properties associated with the saved template to replace the properties with integrated code generated from an integrated code content template; and
computer usable program code for saving the integrated code to an integrated code file in response to all of the properties being processed, wherein the integrated code content template contains all support import libraries necessary for the integrated code generation, wherein the generated integrated code is adapter-specific integrated code for adapter-specific property templates that is operable by an integration broker to facilitate an exchange of data with other applications in a business integration process.

15. The computer program product of claim 14, further comprising:
computer usable program code for launching a compiler to build executable code based on the integrated code file.

16. The computer program product of claim 14, wherein the computer usable program code for loading properties associated with the saved template is initiated responsive to receiving a notification that a template has been saved.

17. The computer program product of claim 14, further comprising:
computer usable program code for receiving a request to modify a template;
computer usable program code for receiving modifications to the template;
computer usable program code for determining if modifications to the template are complete by saving the template forming the saved template; and
computer usable program code for initiating the generation of integrated code by sending a notification in response to saving the template.

18. The computer program product of claim 17, wherein the modifications made to the template are made through a graphical user interface editor.

19. The computer program product of claim 18, wherein the graphical user interface supports property type, hierarchical properties, multiple values, flags, dependencies property, and default values for the properties.

20. The computer program product of claim 14, wherein the integrated code is adapter-specific integrated code.

* * * * *